US009833647B2

(12) United States Patent
Kawiecki (10) Patent No.: US 9,833,647 B2
(45) Date of Patent: Dec. 5, 2017

(54) WILDFIRE ARREST AND PREVENTION SYSTEM

(71) Applicant: The Boeing Company, Chicago, IL (US)

(72) Inventor: Grzegorz M. Kawiecki, Madrid (ES)

(73) Assignee: The Boeing Company, Chicago, IL (US)

(*) Notice: Subject to any disclaimer, the term of this patent is extended or adjusted under 35 U.S.C. 154(b) by 795 days.

(21) Appl. No.: 13/937,217

(22) Filed: Jul. 9, 2013

(65) Prior Publication Data

US 2014/0027131 A1    Jan. 30, 2014

(30) Foreign Application Priority Data

Jul. 24, 2012    (EP) .................................. 12382298

(51) Int. Cl.
| | |
|---|---|
| *A62C 2/00* | (2006.01) |
| *A62C 3/02* | (2006.01) |
| *B64D 1/16* | (2006.01) |
| *G08B 17/00* | (2006.01) |
| *A62C 37/00* | (2006.01) |
| *G08B 17/12* | (2006.01) |

(52) U.S. Cl.
CPC .......... *A62C 3/0228* (2013.01); *A62C 3/0242* (2013.01); *A62C 3/0271* (2013.01); *A62C 37/00* (2013.01); *B64D 1/16* (2013.01); *G08B 17/005* (2013.01); *B64C 2201/12* (2013.01); *G08B 17/125* (2013.01)

(58) Field of Classification Search
CPC ..... A62C 3/0228; A62C 37/00; A62C 3/0242; A62C 3/0271; B64D 1/16; G08B 17/005; G08B 17/125; B64C 2201/12

USPC .......................................................... 169/47
See application file for complete search history.

(56) References Cited

U.S. PATENT DOCUMENTS

| | | | | |
|---|---|---|---|---|
| 6,364,026 B1 * | 4/2002 | Doshay | ................ | A62C 3/0271 169/36 |
| 7,909,111 B1 * | 3/2011 | Hinojosa | ............... | A62C 3/0214 169/16 |
| 8,165,731 B2 * | 4/2012 | Akcasu | .................. | A62C 3/025 102/367 |
| 2004/0069505 A1 * | 4/2004 | Griffin | ................. | A62C 3/0228 169/46 |

(Continued)

FOREIGN PATENT DOCUMENTS

CA          2721996 A1    5/2012

OTHER PUBLICATIONS

Extended European Search Report, EP 12382298, dated Jan. 7, 2013.

*Primary Examiner* — Arthur O Hall
*Assistant Examiner* — Joel Zhou
(74) *Attorney, Agent, or Firm* — McDonnell Boehnen Hulbert (57) ABSTRACT

An apparatus, operations controller and methods for controlling unmanned aerial vehicles for detection, prevention and suppression of fires in a designated zone are presented. Monitored information is received and analyzed to detect a presence of a fire event or a fire risk in the designated zone. A cargo unmanned aerial vehicle is directed to a vicinity of the fire event or the fire risk and instructed to deploy a fire retardant or a fire suppressant at a location of the fire event or the fire risk, if the presence of the fire event or the fire risk is detected.

17 Claims, 4 Drawing Sheets

(56) References Cited

U.S. PATENT DOCUMENTS

2005/0001729 A1* 1/2005 Garmer .................. G08B 25/10
340/577

* cited by examiner

WILDFIRE ARREST AND PREVENTION SYSTEM

CROSS-REFERENCE TO RELATED APPLICATION

This application claims priority under 35 U.S.C. §119 to European patent application Ser. No. 12382298.3, filed 24 Jul. 2012, content of which is incorporated herein by reference in its entirety.

FIELD

The present embodiment of the disclosure relates to apparatus and methods for detection, prevention and suppression of wildfires.

BACKGROUND

Wildfires cause damage resulting in large costs of repair every year. In Europe this can amount to billions of Euros. In the U.S. and Canada alone about 54,500 square kilometers (about 13 million acres) burn each year. Although 99% of around 10,000 new wildfires each year are contained, the damage resulting from the uncontained wildfires and the cost of containing them are not acceptable and growing.

In August 2009, a forest fire occurred in the Angeles National Forest, Calif. Containment was not achieved at an early stage of the fire, and as a result the fire caused significant damage. The cost of the fire is estimated to be nearly $100 million. In comparison a 23.5 square kilometer fire at Kinneloa, near Pasadena, Calif. was controlled from a much earlier stage, and the resulting cost was $9.7 million. It is clear that the cost of an escaped fire is much higher than the cost if control is achieved early. Furthermore, even the most sophisticated of prevention and control measures would be unlikely to amount to the cost of an escaped fire.

In 2010 summer, Russian wild land fires have been estimated to cause around 55,000 deaths between the related heat wave and fire effects, at a cost of $15 billion in damage. The advancing desertification around the Mediterranean Sea basin is continually increasing the cost of wildfires, particularly in Spain, Italy and Greece.

Early fire detection and rapid fire suppression are important to fight the mounting cost of wildfires. A reliability of fire detection systems has improved recently through a combination of a use of conventional means such as observation towers, satellite data, and unmanned aerial systems. The combined effect of these systems provides a timely warning in most cases, at least in areas of particular concern such as national parks. However, the average time to deploy necessary fire suppression assets is too long allowing the fire to escape out of control in a significant number of cases. In other cases where the fire is controlled, this is often achieved by destructive means such as bulldozing firelines or backburning.

Conventional measures for managing wildfires include a bulldozer, a fire truck or other equipment as a water source, and a team with shovels, rakes and hoes. In extreme cases the water source may be a helicopter or aerial tanker which drops the water from above. In other cases larger fire trucks, specialty bulldozers, tree cutting equipment and tools to track and predict the fire's movement may be used. The measures may be difficult to deliver rapidly into a wilderness, except for the helicopters and aerial tankers which are expensive. For example, an aerial tanker may cost around Euro 26 million. Furthermore, poor visibility and strong turbulence caused by fire make aerial delivery of fire suppressant a high risk operation. Workers delivering the suppressant have to work rapidly putting them under high levels of pressure which can result in poor delivery precision at the target location.

Another method to fight fire in remote areas is to send elite firefighters (smoke jumpers) who are parachuted into affected areas, but this may not be without significant dangers and this approach has claimed numerous lives.

SUMMARY

An apparatus, operations controller and methods for controlling unmanned aerial vehicles for detection, prevention and suppression of fires in a designated zone are presented. Monitored information is receive and analyzed to detect a presence of a fire event or a fire risk in the designated zone. A cargo unmanned aerial vehicle is directed to a vicinity of the fire event or the fire risk and instructed to deploy a fire retardant or a fire suppressant at a location of the fire event or the fire risk, if the presence of the fire event or the fire risk is detected.

In this manner simple, cost effective systems and methods are provided for assuring delivery of fire suppressant in time to prevent significant fire-related non-optimalities caused by wildfire spreading.

In an embodiment, an apparatus for detection, prevention and/or suppression of fires in a designated zone comprises a monitoring system, a cargo unmanned aerial vehicle, and an operation controller. The monitoring system monitors the designated zone and communicates the monitored information. The cargo unmanned aerial vehicle is configured to carry a cargo comprising a fire retardant or a fire suppressant, and deliver the fire retardant or the fire suppressant to a fire location of a fire event or a fire risk, and deploy the fire retardant or the fire suppressant at the fire location. The operation controller receives the monitored information and analyzes the monitored information to detect a presence of the fire event or the fire risk in the designated zone. The operation controller further directs the cargo unmanned aerial vehicle to a vicinity of the fire event or the fire risk and instruct the unmanned aerial vehicle to deploy the fire retardant or the fire suppressant at the location of the fire event or fire risk, if the presence of the fire event or the fire risk is detected.

In another embodiment, a method for detection, prevention and/or suppression of fires in a designated zone monitors the designated zone to provide monitored information and communicates the monitored information via a monitoring system. The method further receives the monitored information at an operation controller, and analyzes the monitored information at the operation controller to detect a presence of a fire event or a fire risk in the designated zone. The method further directs a cargo unmanned aerial vehicle to a vicinity of the fire event or the fire risk and instructs the unmanned aerial vehicle to deploy a fire retardant or a fire suppressant at a location of the fire event or fire risk, if the presence of the fire event or the fire risk is detected.

In a further embodiment, an operations controller for controlling unmanned aerial vehicles for detection, prevention and suppression of fires in a designated zone receives monitored information, and analyzes the monitored information to detect a presence of a fire event or a fire risk in the designated zone. The operations controller directs a cargo unmanned aerial vehicle to a vicinity of the fire event or the fire risk and instruct the unmanned aerial vehicle to deploy a fire retardant or a fire suppressant at a location of the fire event or the fire risk, if the presence of the fire event or the fire risk is detected.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block modules and various processing steps. It should be appreciated that such block modules may be realized by any number of hardware, software, and/or firmware modules configured to perform the specified functions. For the sake of brevity, conventional techniques and components related to fire suppression systems, and communication systems may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a non-limiting application, namely, fire suppression. Embodiments of the disclosure, however, are not limited to such fire suppression applications, and the techniques described herein may also be utilized in other applications.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Unmanned aerial vehicles have been proposed for fire detection roles, such as monitoring and surveillance of an area at risk. It has been reported that in June 2011, as a wildfire in Arizona raged, a UAV was sent over residential neighborhoods to search for brush fires. The UAV carried an infra-red camera which was controlled from a remote ground location and aimed through smoke to identify the fires. Once the fires had been identified, the location of the fires was supplied to airborne firefighters who were flown in to douse the fires. The UAV was also used to monitor the fire to confirm that a temperature of the fire was reduced while the airborne firefighters worked.

In contrast, embodiments of the disclosure provide systems and methods to use unmanned aerial systems not only for detection, but also for prevention and suppression of fires as explained in more detail below.

The present disclosure provides an apparatus for detection, prevention and/or suppression of fires in a designated zone, the apparatus comprising: one or more monitoring systems for monitoring the designated zone and communicating monitor information; one or more cargo unmanned aerial vehicles adapted to carry a cargo of fire retardant or suppressant, deliver the fire retardant or suppressant to a location of a fire event or fire risk, and deploy the fire retardant or suppressant at the location; and an operations controller for receiving the monitor information, analyzing the monitor information for the presence of fire events or fire risks in the designated zone, and upon detection of a fire event or fire risk directing the cargo unmanned aerial vehicle to the vicinity of the fire event or fire risk and instructing deployment of the fire retardant or suppressant at the location of the fire event or fire risk.

In an aspect there is provided an apparatus for detection and suppression of fires in a designated zone, the apparatus comprising: one or more monitoring systems for monitoring the designated zone and communicating monitor information; a cargo unmanned aerial vehicle adapted to carry a cargo of fire suppressant, deliver the fire suppressant to a fire event location, and deploy the fire suppressant at the fire event location; and an operations control for receiving the monitor information, analyzing the monitor information for the presence of fire events in the designated zone, and upon detection of a fire event directing the cargo unmanned aerial vehicle to the vicinity of the fire event and instructing deployment of the fire suppressant at the location of the fire event. The apparatus provides an autonomous fire suppressant capability for a large area such as a national park or forest, thereby avoiding exposure of humans to life threatening situations. The apparatus may also provide a continuous and persistent monitoring presence so as to reduce the time from fire outbreak until the fire is brought under control in comparison to conventional measures.

Alternatively the monitoring system may monitor for accumulation of fuel for wildfires, or other risk factors, such as excessively low humidity in a given zone lower than a predetermined threshold, or tinder-dry material, and deliver fire retardant to the region at risk to prevent a fire from starting.

The fire suppressant and retardant may be water. In other embodiments specially formulated foams and/or gels may be used. Alternatively slurries can be used as suppressant or retardant.

The monitoring system may comprise one or more of a monitor unmanned aerial vehicle, a satellite, and/or an observation tower. The monitor unmanned aerial vehicle is adapted to provide monitoring of the designated zone. The monitoring system may comprise a plurality of monitor unmanned aerial vehicles to provide a persistent airborne monitoring presence of at least one of the plurality of monitor unmanned aerial vehicles.

The one or more monitor unmanned aerial vehicles may be any lighter-than-air or heavier-than-air, fixed or rotary wing air vehicles.

The fire event may be a wildfire, hot spot, or smoke plume. A hot spot may be an area with an unusually high or anomalous temperature compared to the surroundings. For most land fires, such hot spots may have an estimated temperature greater than 500° C. Conversely peat bog fires may smolder underground but the surface temperature is only slightly elevated. The operations controller may be arranged to analyze the monitor information for areas having a temperature greater than the surrounding areas by a predetermined margin.

The operations controller may be adapted to receive one more of environmental data, surveillance data and weather data, and may be further adapted to perform a fire risk evaluation of the designated zone based on the received data. The environmental data may be the location of geographic objects such as trees and lakes. Surveillance data may be the movement of fuel for wildfires, people, and capital assets that may be damaged by fire.

The operations controller may analyze the monitor information for sources of fuel for wildfires.

The operations controller may be configured to assess the land area of the designated zone to calculate a flight path for the one or more monitor unmanned aerial vehicles. The calculated flight path may be any suitable trajectory, and may, for example, be based on a linear path or circular path. The operations controller may perform trajectory optimization to minimize the fire detection time and/or length of monitor flight paths.

The flight paths may be calculated by dividing the area of the designated zone into strips having a width no greater than twice the maximum detectable distance of a fire event from the monitor unmanned aerial vehicle, and the flight path is along the center line of the strips.

Alternatively or additionally, the flight path may be calculated by dividing the area of the designated zone into circular regions having a diameter no greater than four times the maximum detectable distance of a fire event from the monitor unmanned aerial vehicle, and the flight path is circle centered on the region and of diameter twice the maximum detectable distance of a fire event from the monitor unmanned aerial vehicle. These linear or circular flight paths provide an efficient way of monitoring the designated zone.

The cargo unmanned aerial vehicle may be centrally located at a first base location in the designated area. The operations control module may be configured for directing the cargo unmanned aerial vehicle from the first base location to a second base location in the vicinity of the fire event or a fire risk.

The cargo unmanned aerial vehicle may be a rotary wing aerial vehicle.

The operations controller may be provided in one or more cargo or monitor unmanned aerial vehicles, at one or more ground locations or a combination of these locations.

The operations controller may comprise: a communication module for communicating with the one or more monitoring systems and the cargo unmanned aerial vehicle; an analysis module for analyzing data received from the one or more monitoring systems; and a direction module for instructing movement of the controlled assets. For example, the cargo aerial vehicles may be directed to the fire event or fire risk, and the monitor aerial vehicles may have their trajectory dynamically adapted according to the situation and monitoring needs across the designated zone.

The present disclosure also provides a method for detection and suppression of fires in a designated zone, the method comprising: monitoring the designated zone and communicating monitor information; receiving the monitor information at an operations controller, analyzing the monitor information for the presence of fire events in the designated zone, and upon detection of a fire event directing a cargo unmanned aerial vehicle to the vicinity of the fire event and instructing deployment of fire suppressant at the location of the fire event.

The step of monitoring may be performed by one or more monitor unmanned aerial vehicles. The trajectories of the one or more monitor unmanned aerial vehicles may be set by the operations controller. The trajectory of at least one of the one or more monitor unmanned aerial vehicles may be adjusted such that at least one monitor unmanned aerial vehicle overflies a first area of the designated zone more often than other areas of the designated zone, the first area having a greater incidence of fires or greater risk of fires breaking out than the other areas.

The cargo unmanned aerial vehicle may be based at a first location, and upon detection of fires or a greater risk of fires in a second area, instructs relocation of the cargo unmanned aerial vehicle in the vicinity of the second area. The first and second areas may be the same area of the designated zone.

The present disclosure provides an operations controller for controlling unmanned aerial vehicles for detection and suppression of fires in a designated zone, the controller adapted to: receive monitor information from one or more monitoring systems relating to the designated zone; analyze the monitor information for the presence of fire events in the designated zone; and upon detection of a fire event direct a cargo unmanned aerial vehicle to the vicinity of the fire event and instruct deployment of fire suppressant at the location of the fire event.

The one or more monitoring systems may comprise an unmanned aerial vehicle. The fire event may be a fire, hot spot, or smoke plume.

The operations controller may be configured to receive one or more of environmental data, surveillance data and weather data. The operations controller may be configured to analyze the monitor information for sources of fuel for wildfires.

In another aspect the present disclosure provides an apparatus for prevention of fires in a designated zone, the apparatus comprising: one or more monitoring systems for monitoring the designated zone and communicating monitor information; a cargo unmanned aerial vehicle adapted to carry a cargo of fire retardant, deliver the fire retardant to a fire risk location, and deploy the fire retardant at a fire risk location; and an operations controller for receiving the monitor information, analyzing the monitor information for the presence of fire risks in areas of the designated zone, and upon detection of a fire risk directing the cargo unmanned aerial vehicle to the vicinity of the fire risk and instructing deployment of the fire retardant at the location of the fire risk.

The monitoring system may comprise one or more of a monitor unmanned aerial vehicle, a satellite, and an observation tower. The monitoring system may comprise a plurality of monitor unmanned aerial vehicles to provide at least one airborne unmanned aerial vehicle monitoring of the designated zone at any time.

The fire risk may be a fuel accumulation. This may be an accumulation of combustible material, such as leaves and other dry flammable materials. The fire risk may additionally or alternatively be extreme dryness, for example of vegetation or undergrowth. Extreme dryness may be measured by low humidity.

The present disclosure provides a method of preventing fires in a designated zone, the method comprising: monitoring the designated zone and communicating monitor information; and receiving the monitor information at an operations controller, analyzing the monitor information for the presence of uncontrolled fuel accumulation in areas of the designated zone, and upon detection of fuel accumulation directing a cargo unmanned aerial vehicle to the vicinity of the fuel accumulation and instructing deployment of fire retardant at the location of the fuel accumulation.

The present disclosure provides an apparatus for the detection and suppression of fires, comprising one or more monitor unmanned aerial vehicles providing a persistent monitoring capability over a designated zone, an operations controller for receiving monitor information from the one or more monitor unmanned aerial vehicles and analyzing the monitor information for fire events, and upon detecting of a fire event instructing a cargo unmanned aerial vehicle to deliver fire suppressant to the location of the fire event.

Figure 1:
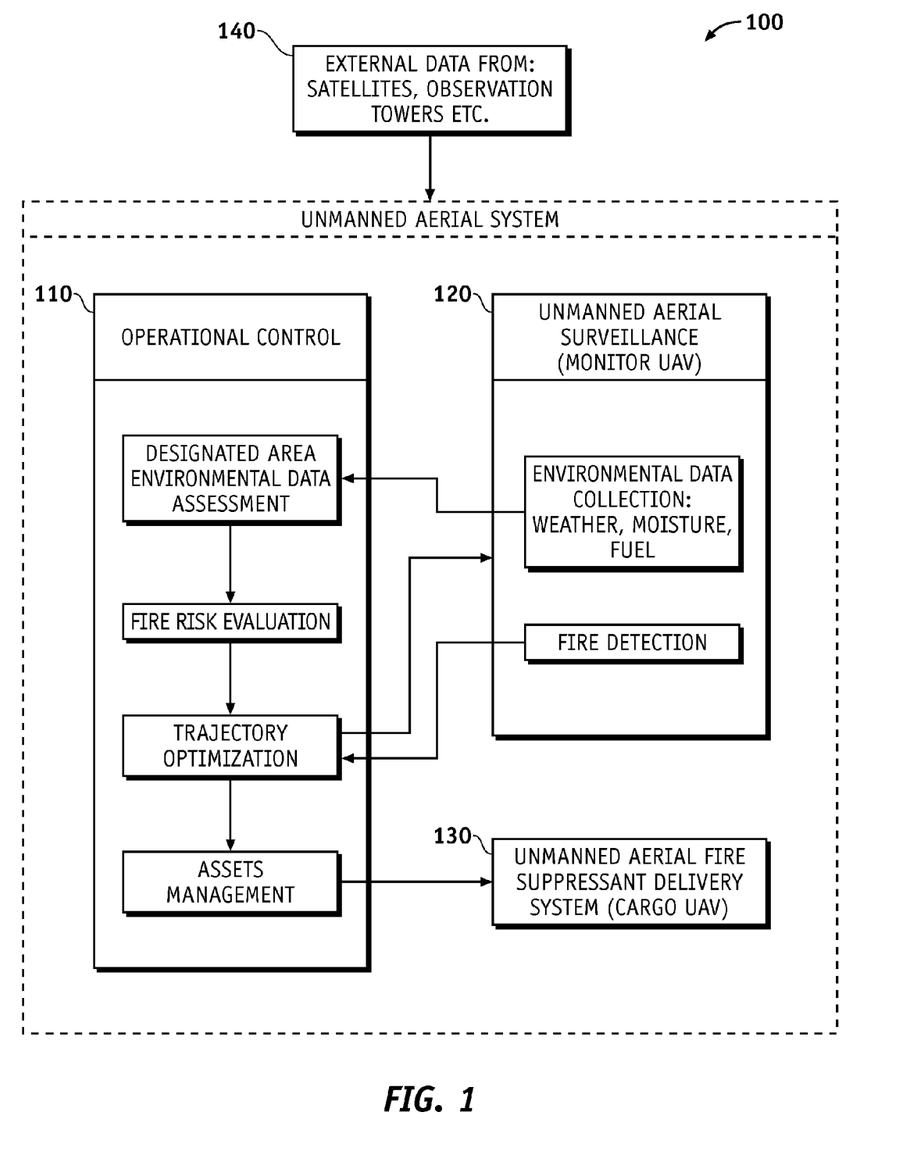
FIG. 1 is an illustration of a functional block diagram of an unmanned aerial vehicle (UAV) fire arrest system according to an embodiment of the disclosure.

FIG. 1 is an illustration of a functional block diagram of an unmanned aerial vehicle (UAV) fire arrest system 100 (system 100) according to an embodiment of the disclosure. The system 100 uses unmanned aerial systems for detection, prevention and suppression of fires. The system 100 may comprise an operations controller 110 (operation controller 110), a monitoring system 120 and cargo unmanned aerial vehicles 130.

The operations controller 110 is configured to control operation of the monitoring system 120 and the cargo unmanned aerial vehicles 130. The operations controller 110 may be located on the ground, on board a monitoring system, or distributed between ground and aerial platforms. The monitoring system 120 may comprise one or more unmanned aerial vehicles. As such, a monitoring system and a monitor unmanned aerial vehicle may be used interchangeably in this document.

The monitoring system 120 scans a designated zone for fire or smoke plumes. The scanning may be performed using one or more cameras or detectors mounted on the UAV. For example, a camera with a wide viewing angle may be located on the UAV facing below the UAV to monitor a path below and to the sides of the UAV.

To increase the width or resolution of the path viewed, a camera may be located on each side of the UAV to view below and to one side of the UAV. The camera(s) or detector(s) may detect light in a visible spectrum or in an infra-red. Infra-red detection has an advantage in that it may provide a measure of a temperature of the area being viewed. Hot-spots may identify location of fires or fire risk areas. Areas affected by smoldering of underground fires in peat bogs may be detected by a moderate increase in temperature. A combination of visible and infra-red cameras, and other sensors may be used.

Additionally, the monitoring system 120 may collect data on local weather and fuel for wildfires. For example, the local weather data may comprise wind speed and direction, temperature, humidity, precipitation, and atmospheric pressure. The wind speed and direction are used to estimate a fire growth and direction of growth based on the wind fanning the flames of the fire. Precipitation data may be used to estimate if rain may aid suppression of fires. Precipitation data may also be accumulated over a period, along with humidity and temperature information, to estimate an amount of moisture present, such as in combustible materials for example, piles of leaves or dead/dry grassy areas. An amount of combustible materials or fuel present may also be monitored.

As well as receiving data from the monitoring system 120 which may be unmanned aerial vehicles, the operations controller 110 may also receive supplementary data 140 from other sources such as satellite data, weather forecasts, observation towers etc. The satellite data may comprise additional monitoring data for identifying the presence and location of fires. However, the satellite data may not always be available. For example, the satellite data may depend on the availability of a satellite above a required location such as if the satellite is in a polar orbit it may have only a short observation window over the required area. The satellite data may also be degraded by cloud cover. An accuracy of location data from a single satellite is limited such that fire location errors of between 2 and 12 km may be expected. The monitor unmanned aerial vehicles 120 are therefore a principal source of fire detection data.

After receiving the environmental data from the monitor unmanned aerial vehicle 120 and optionally from the supplementary data 140 from other sources, the operations controller 110 assesses the data and evaluates a risk of fire across the designated zone. Based on the fire risk distribution across the designated zone, the operations controller 110 determines the areas at risk of fire and directs the monitor unmanned aerial vehicles to those areas. In extreme dry and hot weather the operations controller 110 may determine that the entire designated zone is at risk and the monitor unmanned aerial vehicles may be directed to monitor the whole of the designated zone.

The operations controller 110 may determine a trajectory of the monitor unmanned aerial vehicles 120 such that the risk areas of the designated zone are overflown with a sufficient frequency and by efficient use of the one or more monitor unmanned aerial vehicles.

If the operations controller 110 determines that some areas of the designated zone are at greater risk of fire than other areas, the operations controller 110 may modify the trajectory of the monitor unmanned aerial vehicle(s) according to the estimated fire risk across the designated zone such that areas at higher risk are overflown more frequently than lower risk areas.

The operations controller 110 also assesses an optimal location at which to base fire suppressant delivery devices. In particular, the location of the monitor unmanned aerial vehicles 130 and the operations controller 110 may be assessed. After determination of their optimal location based on areas at greatest risk of fire, the cargo unmanned aerial vehicles 130 are directed to the optimal location or a suitable location for take-off and landing close to the optimal location. As the areas at risk change, the operations controller may shuffle the location of the cargo unmanned aerial vehicles 130 to keep the time for delivery of fire suppressant by a cargo unmanned aerial vehicle as low as reasonably possible.

As mentioned above, the monitor unmanned aerial vehicles 120 may be used to detect fires and/or fuel build up. The requirements for detection of fire and fuel build up are different. A fire may be detected from a greater distance than fuel, and the fire may take minutes to start whereas fuel may build up over a much longer time. For example, a pile of dry leaves may take days to build.

If a fire event such as a fire or smoke plume is detected, the operations controller 110 instructs a cargo unmanned aerial vehicle towards the location of the fire event to deliver fire suppressant on the fire or smoke plume. The flight trajectory of the cargo unmanned aerial vehicle 130 is determined based on terrain and local weather to minimize the reaction time and maximize the effect of the fire suppressant.

The use of monitor unmanned aerial vehicles 120 and cargo unmanned aerial vehicles 130 reduces human exposure to wildfires. The monitor unmanned aerial vehicles 120 provide a continued and persistent monitoring presence. The cargo unmanned aerial vehicles 130 provide a faster response when fires are detected. To provide the continued and persistent monitoring presence, a plurality of monitor unmanned aerial vehicles 120 may be required so that monitoring may continue when there is any down time for example for refueling of one of the monitor unmanned aerial vehicles 120. A number of monitor unmanned aerial vehicles 120 required will depend on a size of the designated zone to be monitored, and the frequency with which it is required to overfly any part of the designated zone.

The various illustrative blocks, modules, processing logic, and circuits described in connection with the system 100 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The illustrated system 100 depicts a simple embodiment for ease of description. These and other elements of the system 100 are interconnected together, allowing communication between the various elements of the system 100. In one embodiment, these and other elements of the system 100 may be interconnected together via a data communication bus.

Figure 2A:
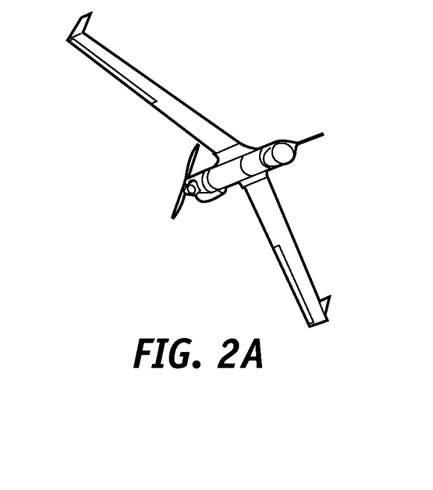
FIGS. 2a, 2b and 2c are illustrations of UAVs that may be utilized in the system of FIG. 1, showing a Scan Eagle, an A160 Hummingbird, and an Unmanned Little Bird respectively.
Figure 2B:
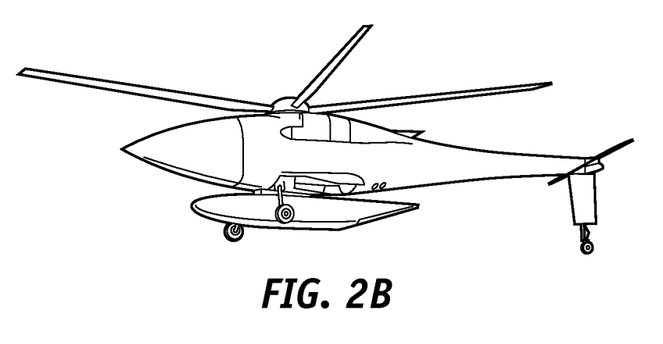
Figure 2C:
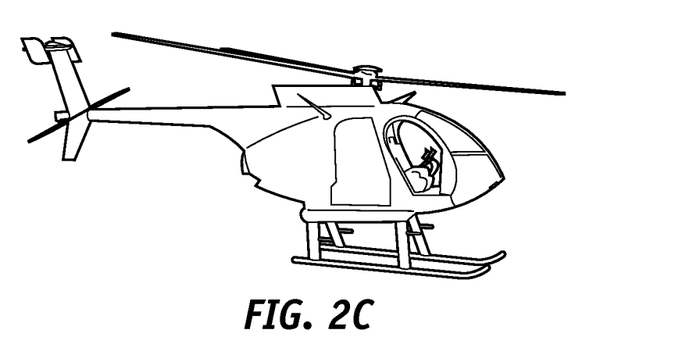

FIGS. 2a, 2b and 2c are illustrations of UAVs that may be utilized in the system 100, showing a Scan Eagle, an A160 Hummingbird, and an Unmanned Little Bird respectively. In an embodiment, the cargo unmanned aerial vehicles 130 comprise a combination of a fixed wing and a rotary wing aircraft. For example, the monitor unmanned aerial vehicle 120 may be a fixed wing Scan Eagle UAV, and the cargo unmanned aerial vehicle 130 may be a rotary wing A160 Hummingbird UAV as shown in FIGS. 2a and 2b. An alternative rotary wing aircraft may be the Unmanned Little Bird UAV as shown in FIG. 2c.

Table 1 below shows some characteristics of the UAVs. In general unmanned fixed wing aerial vehicles are able to provide the endurance for the monitor role, whereas rotary wing aerial vehicles are more suited to carrying large cargos for shorter periods and so are more suited to the fire suppressant role. However, other types of unmanned aerial vehicles can be used for the cargo role, such as fixed wing aerial vehicles, missiles carrying fire suppressant, or a lighter than air vehicle.

TABLE 1

Characteristics of three types of UAV.

| | Scan Eagle | A160 Hummingbird | Little Bird |
|---|---|---|---|
| Wing type | Fixed Wing | Rotary Wing | Rotary Wing |
| Cost (US$ million) | 3 | 3.6 | Unknown |
| Endurance (h)/payload (kg) | 24/2 | 8/500 | 2/700 |
| V max (km/h) | 150 | 300 | 320 |
| V cruise (km/h) | 110 | 220 | 250 |

Table 1 identifies the wing type of each of the UAVs. The approximate cost of the UAV is also set out, where known. The Scan Eagle has the longest endurance at 24 hours and can carry a payload of 2 kg. The A160 Hummingbird has a shorter endurance of 8 hours but can carry a much greater payload of 500 kg. For even greater payloads, the Unmanned Little Bird can carry up to 700 kg. The Scan Eagle has a maximum velocity of 150 km/h and a cruising velocity of 110 km/h. The A160 Hummingbird and Unmanned Little Bird have greater maximum velocities and cruise velocities.

An example scenario of an unmanned aerial system for detection and suppression of wildfires is described above. In this example, it is assumed that a fire or smoke plume may be detected at a distance of about 7.5 km. A maximum acceptable time from fire breakout to delivery of fire suppressant is about 30 minutes. A location of the example scenario is the previously mentioned Angeles National Forest, which may be considered to be the designated zone. The unmanned aerial vehicles used are two A160 Hummingbirds as cargo unmanned aerial vehicles 130, and four Scan Eagles as the monitor unmanned aerial vehicle 120.

The operations controller 110 may be configured to consider two types of trajectory for the monitor UAVs 120. These trajectories are two dimensional (2-D) to cover the designated zone and may be a linear trajectory or a circular trajectory. The operations controller is configured to assess a land area of the designated zone to calculate a calculated flight path for the least one monitor unmanned aerial vehicle. In this manner, the operations controller 110 calculates a calculated linear flight path based on a linear path or a calculated circular flight path based on a circular path. as explained in more detail below.

Figure 3:
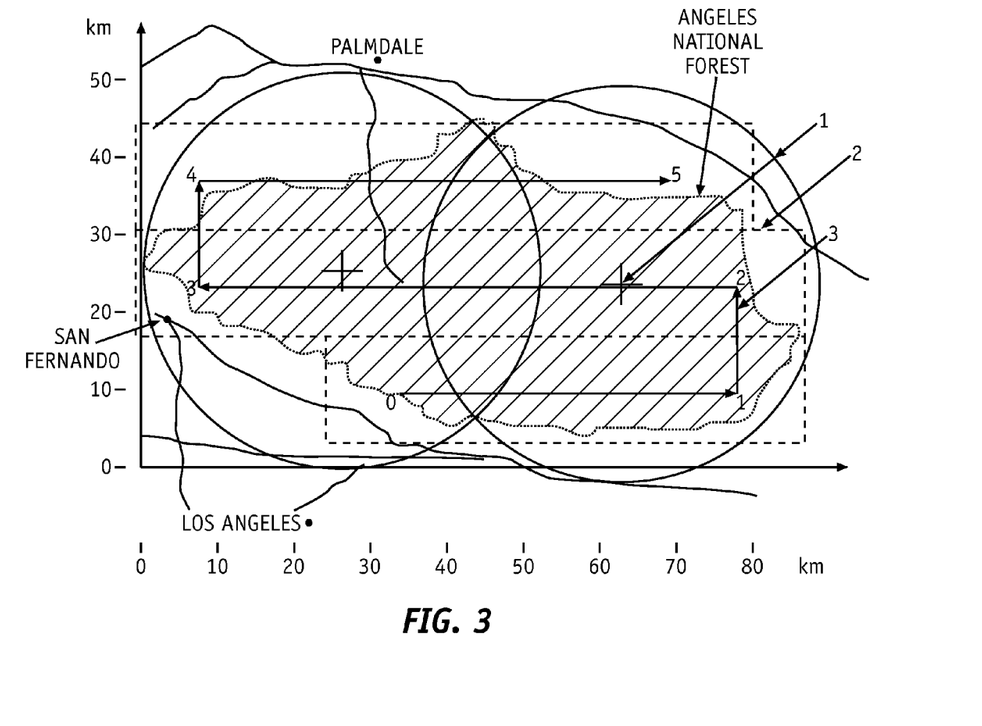
FIG. 3 an illustration of a map of a geographic area showing linear surveillance trajectories for monitoring of a designated zone according to an embodiment of the disclosure.

FIG. 3 an illustration of a map of a geographic area showing linear surveillance trajectories for monitoring of a designated zone according to an embodiment of the disclosure. The linear trajectory is arranged to cover the whole of the designated zone. Numeral 1 identifies an example base location of the cargo unmanned aerial vehicle 130 and a surrounding circle represents its radius of action. Numeral 2 identifies by broken lines stripe areas into which the designated area is divided. Numeral 3 identifies solid arrows which represent a trajectory for the monitor unmanned aerial vehicle 120. The trajectory is along the centre line of the stripe areas 2 and a width of the stripe areas 2 is preferably twice a distance at which fire or smoke may be detected from the monitor UAV 120. Accordingly, in this example the stripe areas2 are about 15 km wide. The trajectory comprises five legs 0-1, 1-2, 2-3, 3-4 and 4-5 as shown on FIG. 4. Approximate lengths of the legs are as follows:

Leg 0-1: 47 km
Leg 1-2: 15 km
Leg 2-3: 72 km
Leg 3-4: 15 km
Leg 4-5: 65 km

A total trajectory length is about 214 km. This does not include a return leg to return the monitor unmanned aerial vehicle 120 to the trajectory start position.

In this example the Scan Eagle operates as the monitor unmanned aerial vehicle 120 and has a cruise velocity of about 110 km/h. A duration to cover the trajectory is therefore around 2 hours. If four Scan Eagles are used, any part of the trajectory may be covered every 30 minutes. The two A160 Hummingbird cargo unmanned aerial vehicles operate from base locations at the centers of the two circles, which together cover the whole of the designated zone with a small overlap. The circles each have a 27 km radius. Therefore, the closest A160 would be able to deliver about 500 kg of fire suppressant in about 5 minutes if flown at its maximum 300 km/h velocity. As a result the maximum time from fire outbreak to delivery of fire suppressant is about 35 minutes. This is close to the target time of about 30 minutes.

Alternatively, the faster A160 Hummingbird may be deployed as the monitor unmanned aerial vehicle 120 with its own fire suppressant cargo to perform both monitor and cargo tasks. Use of four of these vehicles, each with a maximum velocity of 300 km/h, provides a maximum time from start of a fire to delivery of fire suppressant of about 15 minutes.

Figure 4:
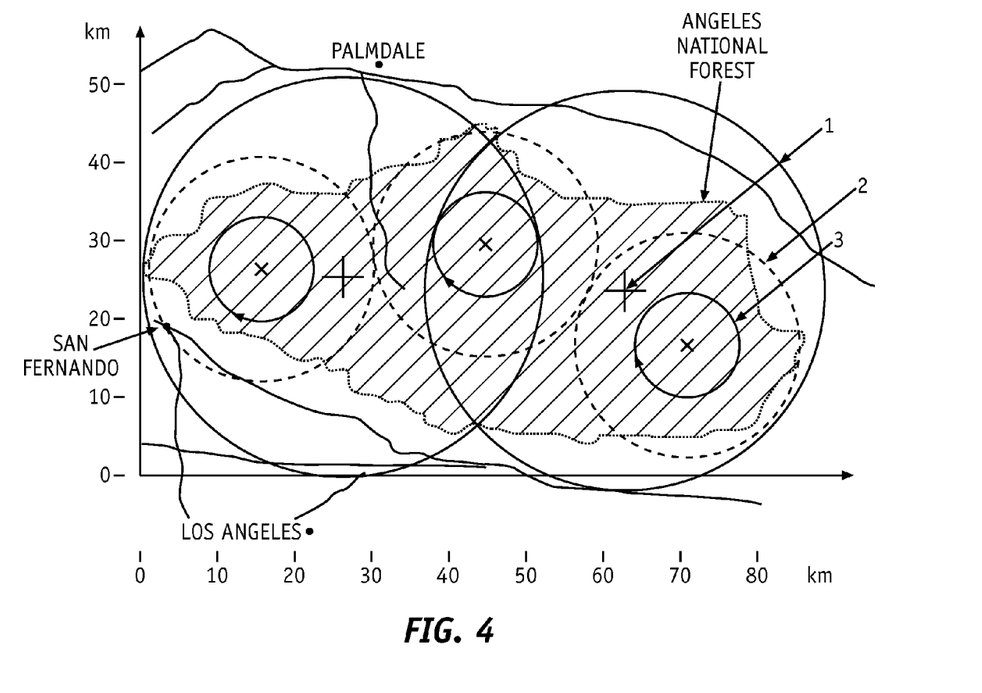
FIG. 4 is an illustration of a map of a geographic area showing circular surveillance trajectories for monitoring of a designated zone according to an embodiment of the disclosure.

FIG. 4 is an illustration of a map of a geographic area showing circular surveillance trajectories for monitoring of the designated zone according to an embodiment of the disclosure. The numeral 1 identifies example base locations of cargo unmanned aerial vehicles 130 and the surrounding circles represent their radius of action. Numeral 2 identifies by broken lines circular areas into which the designated zone is divided. For the example of the Angeles National Park, three circular areas cover over 85% of the park. Numeral 3 identifies solid arrows which represent a trajectory for the monitor unmanned aerial vehicle. In FIG. 4 the trajectories are circular, centered about the circular areas identified by numeral 2. The circular trajectories have a radius of 7.5 km such that all of the area in the 15 km radius circular areas can be observed through flying once around the circle.

That is the radius of the circular trajectory matches the maximum distance from which fires and smoke plumes are observable. Each circular trajectory has a path length of 47 km. This path length will be covered by a Scan Eagle UAV in around 25 minutes. To achieve full 100% coverage of the Angeles National Park four Scan Eagle UAVs would be required. Hence, the circular trajectories require the same number of monitor unmanned aerial vehicles as the linear trajectory of FIG. 3. The delivery of fire suppressant from cargo unmanned aerial vehicles is the same as for FIG. 3, with two cargo UAVs such as A160 Hummingbirds able to reach a target in around 5 minutes. The result being that for a designated zone such as the Angeles National Park, 500 kg of fire suppressant could be delivered within 35 minutes from fire outbreak, in the worst case.

The monitor unmanned aerial vehicles 130 can provide a persistent and continuing 24 hours a day, 7 days a week monitoring presence. Thus at any time an interval between a start of a fire and delivery of a fire suppressant would be at most 35 minutes. The continued and persistent monitoring approach reduces significantly the time interval until fire suppressant is delivered from that for conventional measures. This reduction limits the uncontrolled burn phase of the wildfire allowing the fire to be brought under control more quickly.

During the monitor phase the system may need a little human intervention to the monitor unmanned aerial vehicles 120 and the operations controller 110. The monitor unmanned aerial vehicles 120 and the operations controller 110 are however, able to act largely autonomously during this phase. Even during delivery of fire suppressant, the cargo unmanned aerial vehicles 130 may need little human intervention. Human intervention may occur before and up to launch of the cargo unmanned aerial vehicle 130, such as loading of fire suppressant. Humans are therefore not exposed to dangers at the fire location. The monitor and delivery system can be used in combination with firefighters on the ground to direct them to appropriate locations.

The examples of types of unmanned aerial vehicles provided above have been carefully chosen to suit the monitor and cargo roles. In particular, the cargo unmanned aerial vehicles of type A160 Hummingbird have been chosen for their vertical take-off/landing capability. This type of aircraft does not require a runway and accordingly take-off locations require less infrastructure. The base locations of such aircraft can therefore be shuffled in accordance with areas of greater fire risk. The cargo unmanned aerial vehicles have only recently reached a maturity level such that practical amounts of fire suppressant can be carried by them.

The above-mentioned air vehicles are presented here for illustrative purposes only and that other vehicles, with similar or improved performance capabilities, may be equally suited and are included as alternatives within the scope of this disclosure.

A comparison of the cost of a system comprising a monitor unmanned aerial vehicle, a cargo unmanned aerial vehicle and an operations controller, with that of wildfire escape or conventional measures makes the system described herein particularly favorable. For example, a monitor unmanned aerial vehicle such as the Scan Eagle has an approximate cost of US$3 million, and a cargo unmanned aerial vehicle such as an A160 Hummingbird has an approximate cost of US$3.6 million. These prices are low compared with that of an escaped wildfire which would result in $billions in cost, or a conventional manned aerial tanker for deploying fire suppressant which cost around US$26 million.

The person skilled in the art will readily appreciate that various modifications and alterations may be made to the above described methods and apparatus without departing from the scope of the appended claims. For example, different UAVs and trajectories for the monitor UAVs may be used according to the shape and size of the designated zone and other relevant factors, such as weather anomalies or risk level distribution.

In this document, the terms "computer program product", "computer-readable medium", and the like may be used generally to refer to media such as, for example, memory, storage devices, or storage unit. These and other forms of computer-readable media may be involved in storing one or more instructions for use by the processor module to cause the processor module to perform specified operations. Such instructions, generally referred to as "computer program code" or "program code" (e.g., which may be grouped in the form of computer programs or other groupings), when executed, enable the system 100.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 1 depicts example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or modules of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. Apparatus for prevention of fires in a designated zone, the apparatus comprising:
   at least one monitor unmanned aerial vehicle operable to:
      monitor the designated zone to provide monitored information; and
      communicate the monitored information;
   at least one cargo unmanned aerial vehicle operable to:
      carry a cargo comprising a fire retardant;
      deliver the fire retardant to a location; and
      deploy the fire retardant at the location; and
   an operation controller operable to:
      receive the monitored information;
      determine, based at least in part on the monitored information, a fire risk distribution across the designated zone, wherein the determined fire risk distribution identifies a first area of the designated zone having a greater risk of fires breaking out than a risk of fires breaking out in a second area of the designated zone;
      while the designated zone is free of fires, direct one of the at least one cargo unmanned aerial vehicles from a first base location to a second base location such that, for the first area, a time from fire breakout to delivery of the fire retardant is reduced, wherein the second base location is closer to the first area than the first base location is; and
      upon detection of a fire risk at a particular location and before a fire starts at the particular location, direct the cargo unmanned aerial vehicle from the second base location to the particular location and instruct the cargo unmanned aerial vehicle to deploy the fire retardant at the particular location.

2. The apparatus of claim 1, wherein the at least one monitor unmanned aerial vehicle comprises a plurality of monitor unmanned aerial vehicles each operable to provide a persistent airborne monitoring presence of at least one of the monitor unmanned aerial vehicles.

3. The apparatus of claim 1, wherein the apparatus is adapted to provide autonomous fire prevention.

4. The apparatus of claim 1, wherein the operation controller is further operable to:
   receive received data comprising: environmental data, surveillance data, weather data, or a combination thereof,
   wherein the determining fire risk distribution is further based on the received data.

5. The apparatus of claim 1, wherein the operation controller is further operable to analyze the monitored information to detect a presence of fire risks comprising: an accumulation of fuel for a wildfire, a tinder-dry material, a humidity lower than a predetermined threshold, or a combination thereof.

6. The apparatus of claim 5, wherein the accumulation of fuel comprises an accumulation of combustible material comprising: leaves, dry flammable materials, or a combination thereof.

7. The apparatus of claim 1, wherein:
   the operations controller is configured to assess a land area of the designated zone to calculate a calculated flight path for the least one monitor unmanned aerial vehicle.

8. The apparatus of claim 7, wherein the calculated flight path comprises a linear flight path based on a linear path or a circular flight path based on a circular path.

9. The apparatus of claim 8, wherein:
   the linear flight path is calculated based on dividing the land area of the designated zone into strips having a width not greater than twice a maximum detectable distance of fire risks from the at least one monitor unmanned aerial vehicle; and
   the flight path is along a center line of the strips.

10. The apparatus of claim 8, wherein:
    the circular flight path is calculated based on dividing the land area of the designated zone into circular regions having a diameter not greater than four times a maximum detectable distance of fire risks from the at least one monitor unmanned aerial vehicle; and the flight path is a circle centered on a region and of diameter twice the maximum detectable distance of fire risks from the at least one monitor unmanned aerial vehicle.

11. A method for prevention of fires in a designated zone, the method comprising:

receiving monitored information at an operation controller and from at least one monitor unmanned aerial vehicle;

determining, based at least in part on the monitored information, a fire risk distribution across the designated zone, wherein the determined fire risk distribution identifies a first area of the designated zone having a greater risk of fires breaking out than a risk of fires breaking out in a second area of the designated zone;

while the designated zone is free of fires, directing a cargo unmanned aerial vehicle from a first base location to a second base location such that, for the first area, a time from fire breakout to delivery of fire retardant is reduced, wherein the second base location is closer to the first area than the first base location is; and upon detection of a fire risk at a particular location and before a fire starts at the particular location, directing the cargo unmanned aerial vehicle from the second base location to the particular location and instructing the cargo unmanned aerial vehicle to deploy the fire retardant at the particular location.

12. The method of claim 11, further comprising adjusting a trajectory of the at least one monitor unmanned aerial vehicle according to the determined fire risk distribution such that the at least one monitor unmanned aerial vehicle overflies the first area of the designated zone more often than the second area of the designated zone.

13. An operations controller for controlling unmanned aerial vehicles for prevention of fires in a designated zone, the operations controller comprising:

a controller operable to:

receive monitored information corresponding to the designated zone from at least one monitor unmanned aerial vehicle;

determine, based at least in part on the monitored information, a fire risk distribution across the designated zone, wherein the determined fire risk distribution identifies a first area of the designated zone having a greater risk of fires breaking out than a risk of fires breaking out in a second area of the designated zone;

while the designated zone is free of fires, direct a cargo unmanned aerial vehicle from a first base location to a second base location such that, for the first area, a time from fire breakout to delivery of a fire retardant is reduced, wherein the second base location is closer to the first area than the first base location is; and upon detection of a fire risk at a particular location and before a fire starts at the particular location, direct the cargo unmanned aerial vehicle from the second base location to the particular location and instruct the cargo unmanned aerial vehicle to deploy the fire retardant at the particular location.

14. The operations controller of claim 13, wherein the controller is further operable to assess a land area of the designated zone to calculate a calculated linear flight path or a calculated circular flight path for the least one monitor unmanned aerial vehicle.

15. The operations controller of claim 14, wherein the controller is further operable to calculate the calculated linear flight path based on dividing the land area of the designated zone into strips having a width not greater than twice a maximum detectable distance of fire risks from the at least one monitor unmanned aerial vehicle, wherein the flight path is along a center line of the strips.

16. The operations controller of claim 14, wherein the controller is further operable to calculate the calculated circular flight path based on dividing the land area of the designated zone into circular regions having a diameter not greater than four times a maximum detectable distance of fire risks from the at least one monitor unmanned aerial vehicle, wherein the calculated circular flight path comprises a circle centered on a region and of diameter twice the maximum detectable distance of fire risks from the at least one monitor unmanned aerial vehicle.

17. The operations controller of claim 13, wherein the controller is further operable to adjust a trajectory of the at least one of the monitor unmanned aerial vehicle such that the at least one monitor unmanned aerial vehicle overflies the first area of the designated zone more often than the second area of the designated zone.

* * * * *